(12) United States Patent
Cheng

(10) Patent No.: US 6,616,534 B2
(45) Date of Patent: Sep. 9, 2003

(54) BUTTON CONTROL FOR USE IN A GAME CONTROLLER

(75) Inventor: Chiu-Hao Cheng, Chung Ho (TW)

(73) Assignee: Zeroplus Technology Co., Ltd., Chung Ho Hsien (TW)

( * ) Notice: Subject to any disclaimer, the term of this patent is extended or adjusted under 35 U.S.C. 154(b) by 0 days.

(21) Appl. No.: 09/736,221

(22) Filed: Dec. 15, 2000

(65) Prior Publication Data

US 2001/0023203 A1 Sep. 20, 2001

(30) Foreign Application Priority Data

Dec. 16, 1999 (TW) ........................................ 88221451 U
Mar. 22, 2000 (TW) ........................................ 89204639 U
Apr. 26, 2000 (TW) ........................................ 89206816 U

(51) Int. Cl.$^7$ .......................... H01C 10/10; G06F 3/033; A63F 13/06; G09G 5/00; H01H 13/00

(52) U.S. Cl. ........................................ 463/37; 338/114

(58) Field of Search ............................. 463/37, 36, 39; 345/159, 184; 338/114, 112

(56) References Cited

U.S. PATENT DOCUMENTS 4,257,305 A * 3/1981 Friend et al. ................ 338/114

* cited by examiner

Primary Examiner—Joseph Pelham
(74) Attorney, Agent, or Firm—Bacon & Thomas, PLLC

(57) ABSTRACT

A button control for use in game controllers is arranged such that when the button is pressed down, the angle and magnitude of the force of each depression will determine the amount of contact between the conducting jell and the resistor strip or the conducting tracks located on the printed circuit board and thereby determine the magnitude of the output signals so as to gain greater game control. Further, when said resistor strip is made a cut-open, discontinuous structure, then when the conducting jell begins to press on the resistor strip, the resistance changes from infinite resistance to maximum resistance to facilitate reading of button control status.

2 Claims, 13 Drawing Sheets

BUTTON CONTROL FOR USE IN A GAME CONTROLLER

FIELD OF THE INVENTION

This present invention relates to a button control for use in game controllers. When the button is pressed down, the angle and magnitude of the force of each depression will determine the amount of contact between the conducting jell and the resistor strip or the conducting tracks located on the printed circuit board and thereby determine the magnitude of the output signals so as to gain greater game control. Further, when said resistor strip is made a cut-open, discontinuous structure, then when the conducting jell begins to press on the resistor strip, the resistance changes from infinite resistance to maximum resistance to facilitate reading of button control status.

THE PROBLEM TARGETED BY THE PRESENT INVENTION

FIG. 1(A) shows a conventional controller 10 equipped with a casing 11 and a plurality of buttons 12 and a cross button 18. The buttons of the controller 10 are shown in FIGS. 1(B) and 1(C). In FIG. 1(B), underneath the button 12 is a rubber member 13, and within the rubber member 13 is conducting jell 14 which is directly facing a pair of conducting pieces 16, 17 on the printed circuit board (PCB) 15. The bottom surface of the rubber member 13 is fixed on the PCB 15. FIG. 1(B) shows the normal state when no pressure is exerted on button 12. But when button 12 is pressed, the pressure will cause the elastic rubber member 13 to deform, and the displacement then causes the conducting jell 14 to contact with the conducting pieces 16, 17, causing electrical conduction between the conducting pieces 16 and 17 and a digital signal is produced and output to the game controller. When the pressure is removed, the rubber member 13 retracts to its prior shape as in FIG. 1(B), causing electrical disconnection between conducting pieces 16 and 17 and disabling signal output.

However, the characteristic of "one press for one digital signal" of the button 12 of the conventional game controller 10 is unable to satisfy the demands for versatile manipulation of the game software. Similarly, in the case of the cross button 18 where "one press for one digital signal" in the respective directions of up, down, left and right is likewise unable to meet the demands for versatile game manipulation.

SOLUTION OFFERED BY OF THE PRESENT INVENTION

The object of the present invention is to provide a button control for use in game controllers, which is an improvement over the conventional cross button and ordinary button as described above. When this button is pressed downward, the angular direction and the magnitude of the depressing force will determine the contact area between the conducting jell and the resistor strip or conducting tracks on the PCB and thereby determine the magnitude of the output signals so as to gain greater maneuverability of the game controller. Further, said resistor strip is cut-open or discontinuous structure so that when the conducting jell presses downward and contacts the resistor strip, the resistor value changes from a infinite to a maximum value to facilitate easy reading of the button status.

Figure 1A:
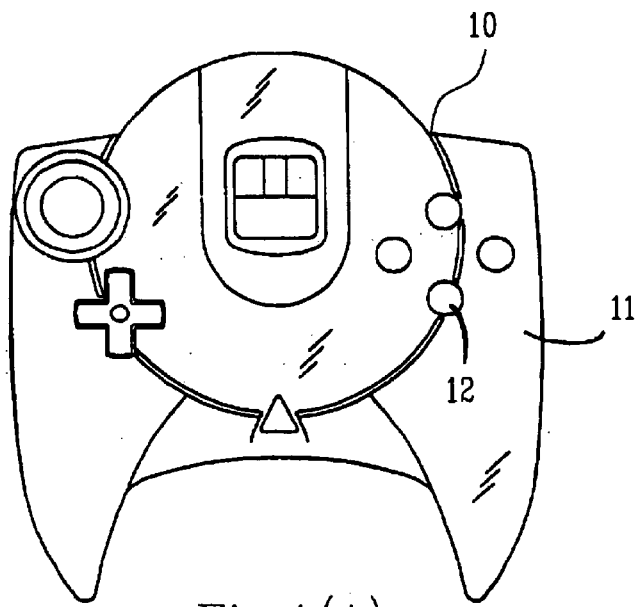
FIG. 1. A schematic of the conventional game controller: (A) a planar view; (B) when button is not pressed; (C) when button is pressed.

Numbering Scheme of Elements 11 casing 37 spring
13 rubber member 38 casing body
14 conducting jell 39 spring
15 printed circuit board 41 bottom surface
16, 17 conducting metal 42, 52 emitter
31 conductor 43, 53 receiver
32 stopper 51 card
33 resistor 54 elongated aperture
34 resistor 55 triangular aperture
70 cone conducting jell 60 circular cone conducting jell
71 carbon ink 61, 63 conducting tracks
35, 36, 44, 45, 62, 72 leads
12, 20, 30, 40, 50 button 20 cross button
21, 132 rubber member 22, 133 conducting jell
23 printed circuit board 24 resistor strip
25 key tab 26 protruded portion
27 depressed portion 30 button
131, 134, 135 sloped plane 140 conducting tracks
150 tin piece a partition point

DETAILED DESCRIPTION OF THE INVENTION

Figure 2:
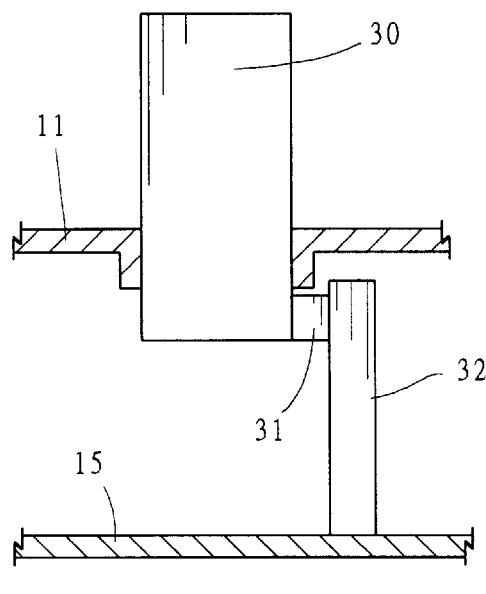
FIG. 2. The first instance of embodiment of the casing of the game controller of the present invention: (A) when the button is not displaced; (B) viewed from the left hand side the initial position of the displacement in FIG. 2(A); (C) button's maximum displacement; (D) viewed from the left hand side the position of the maximum displacement of FIG. 2(C).
Figure 2:
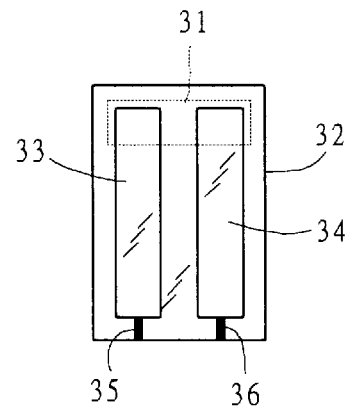
Figure 2:
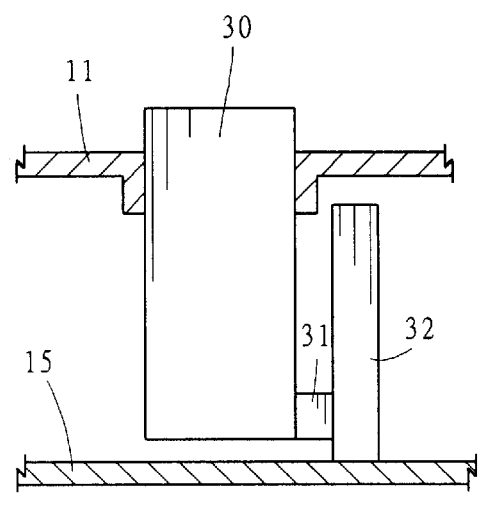
Figure 2:
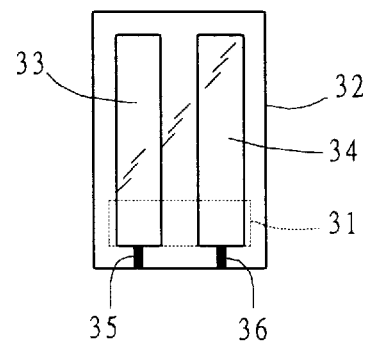

As shown in FIG. 2, button 30 has a conductor 31 which is in contact with a region above a pair of resistors 33, 34 positioned at lateral surface of a stopper 32 when at the initial position shown in FIG. 2(B). Said stopper 32 is mounted on the printed circuit board 15 and the leads 35, 26 of resistors 33, 34 are connected to printed circuit board 15. When button 30 is pressed down, it and the conductor 31 can displace to the lowest position shown in FIGS. 2(C) and 2(D); at this position, conductor 31 is below the resistors 33, 34. As such, by moving above and below the resistors, the resistance value can be varied to produce varying analog signals. When button 30 is no longer pressed down, a spring not shown can retract it back to its initial position shown in FIG. 2(A) or 2(B).

Figure 3:
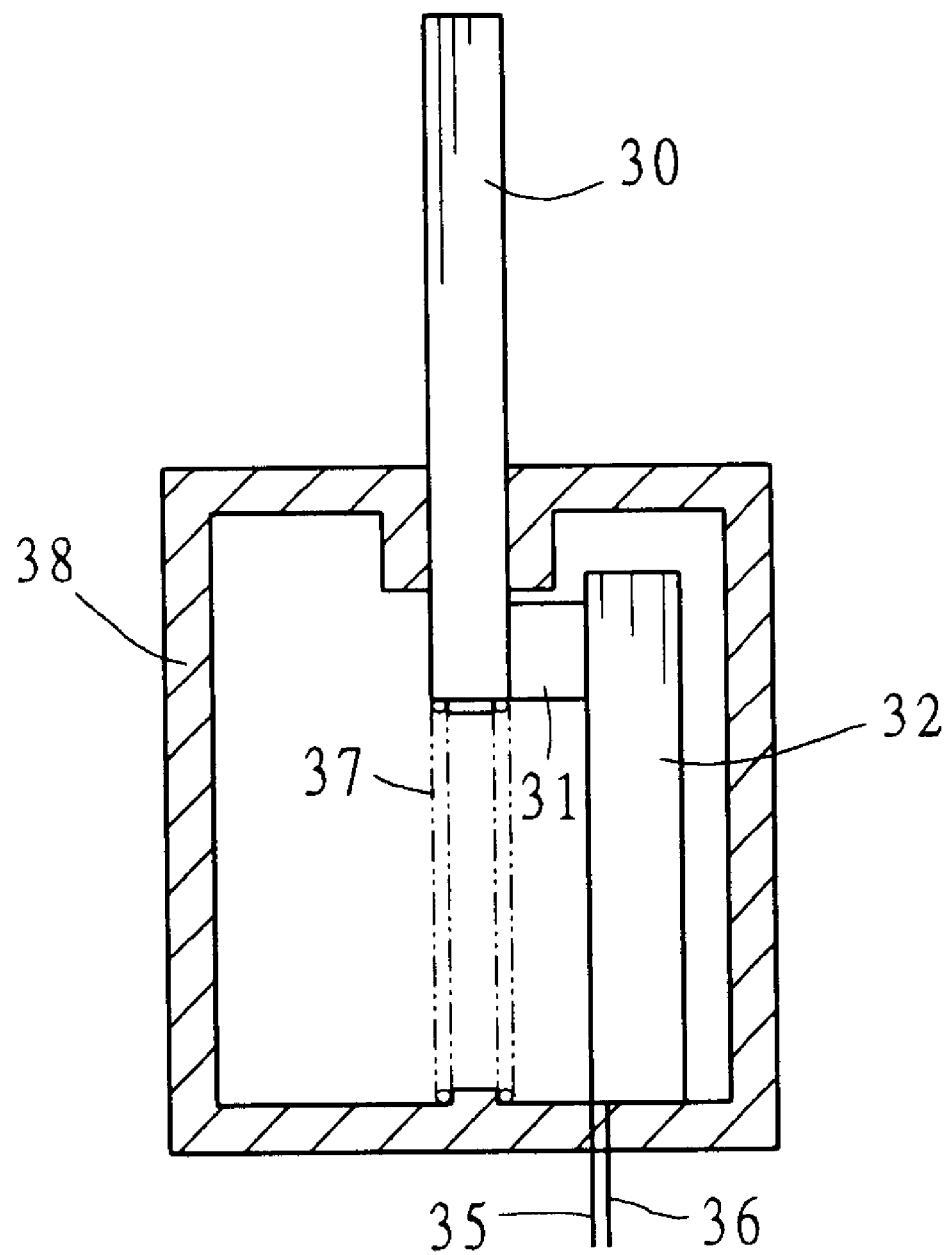
FIG. 3. The first instance of embodiment of an unitary body button control based on the structure shown in FIG. 2.

In FIG. 3, button 30, conductor 31, stopper 32, resistors 33, 34 (see FIG. 2) and retracting spring 37 are all contained within the casing 38. Leads 35, 36 of said resistors 33, 34 pass through the casing for external electrical connection. This unitary body button control can be supplied with game control console like one of the components, so as to reduce assembly and increase flexibility in design.

Figure 4:
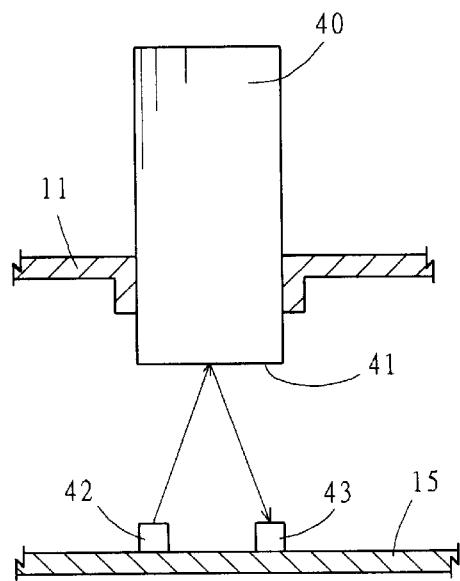
FIG. 4. The second instance of embodiment of the present invention in combination with the game control console.

In FIG. 4, when button 40 is not yet displaced, the emitter 42 and receiver 43 mounted on printed circuit board 15 are reflective light sensors. The bottom surface 41 of button 40 is used to reflect light. So that when button 40 is pressed or released, the variation in the distance between the bottom surface 41 and the emitter 42 and receiver 43 will result in variation in the intensity of light reflected and cause signal output of varying strengths. In FIG. 4, the spring that retracts button 40 is not shown.

Figure 5:
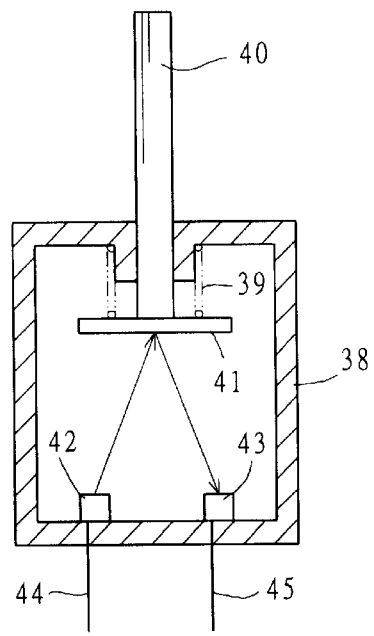
FIG. 5. The second instance of embodiment of an unitary body button control based on the structure shown in FIG. 4.

In FIG. 5, the button 40, bottom surface 41, spring 39, receiver 43, emitter 42 are contained within the casing 38, and leads 44, 45 of emitter 42 and receiver 43 pass through the casing 38 for external electrical connection. This button control also possesses the fine features shown in FIG. 3.

Figure 6:
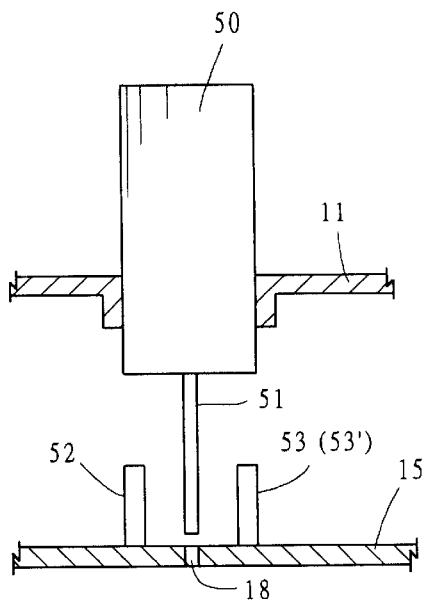
FIG. 6. The third instance of embodiment of the present invention in combination with the game control console: (A) structural view before the button is pressed; (B) the signal output diagram after button shown in (A) is pressed; (C) an exemplary card used in (A); (D) another exemplary card.
Figure 6:
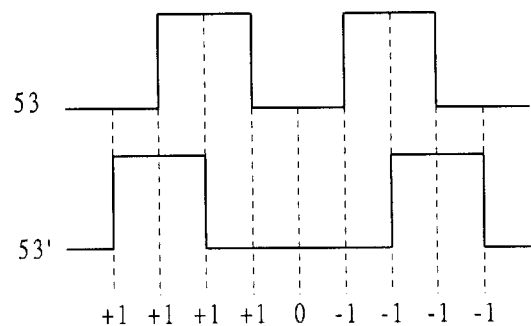
Figure 6:
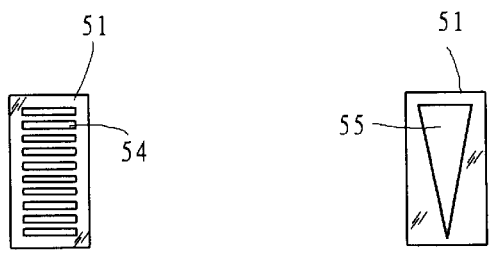

In FIG. 6(A), the emitter 52 and a pair of receivers 53, 53' mounted on the printed circuit board 15 (receivers 53, 53' are lined up in a row perpendicularly to the drawing) are light sensitive sensors, using the card 51 under the button 50 as the medium for light to pass through; on the printed circuit board 15 facing relative to the card 51 is an aperture 18, which provides a passageway for the card 51 as it moves down when the button 50 is depressed. A plurality of parallel elongated apertures 54 are rendered in the card 51 as shown in FIG. 6(C). When button 50 is depressed or released, a pair of receivers 53, 53' receive intermittent signals from emitter 52 as the light passes through the apertures 54 during displacement of card 51, as shown in the signal wave chart FIG. 6(B), (in FIG. 6(B), the phase of receiver 53 is ahead of that of receiver 53'.) Said receiver can be just one (e.g. no receiver 53'), in which case the apertures 55 in card 51 are of varying widths as shown in FIG. 6(D) (such as inverse triangular apertures.) By virtue of the variation in the amount of the light passes through the apertures in card 51, varying analog signals can be produced. In FIG. 6, the retracting spring for button 50 is not shown.

Figure 1B:
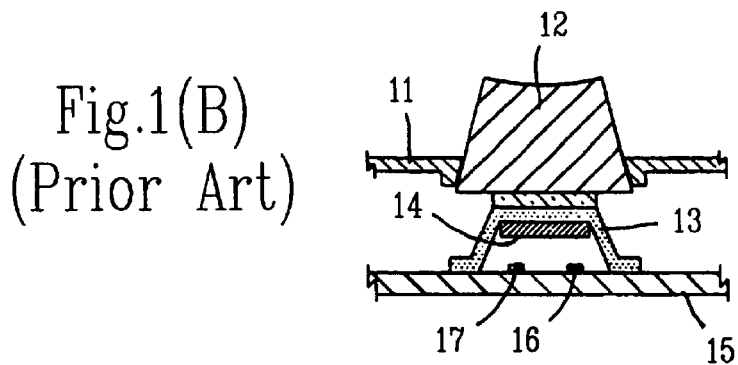
Figure 1C:
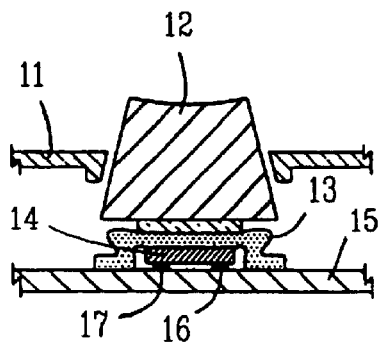
Figure 7:
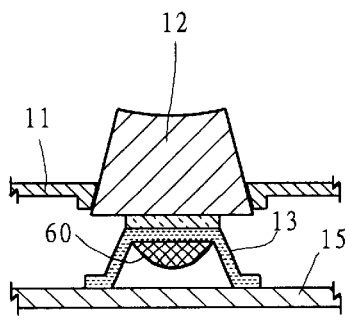
FIG. 7. The fourth instance of embodiment of the present invention in combination with the game control console: (A) structural view before the button is pressed; (B) the conducting tracks on the printed circuit board shown in 7(A) opposite to the circular cone conducting jell; (C) another instance of exemplary conducting tracks as shown in (B).
Figure 7:
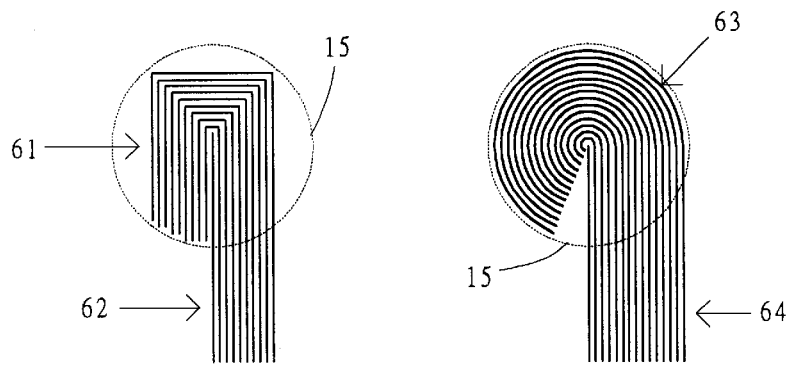

In FIG. 7, the instance of embodiment shown is different than that of the conventional art shown in FIG. 1(B). The conducting jell in FIG. 7 is circular cone conducting jell 60 (see FIG. 7(A)), and installed on the contact area facing relative to the conducting jell 60 on the printed circuit board 15 are a plurality of rectangular conducting tracks 61 (FIG. 7(B)) or circular conducting tracks 63 (FIG. 7(C)). On each of said conducting tracks 61 and conducting tracks 63 is conducting lead 62 and 64 to connect to other circuit areas of printed circuit board 15.

In FIG. 7, when pressing button 12, the circular cone conducting jell 60 will first contact conducting tracks 61 or 63 in the central region, and as the button is pressed further downward, the circular cone conducting jell will deform and thus enlarges the portion in contact with the conducting tracks 61, 63. The variation in the contact area (number of tracks in contact) between the circular cone conducting jell and the conducting tracks 61, 62 results in varying analog signal output.

Figure 8:
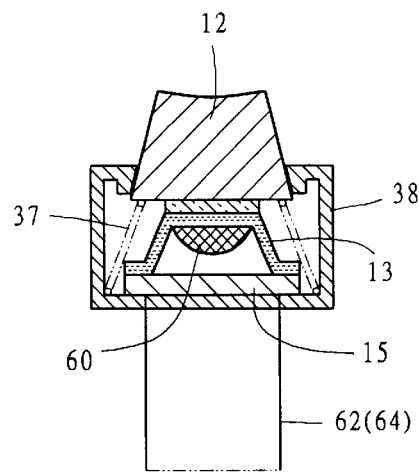
FIG. 8. The third instance of embodiment of an unitary body button control based on the structure shown in FIG. 7.

In FIG. 8, button 12, rubber member 13, circular cone conducting jell 60, spring 37, printed circuit board 15 with the conducting tracks are all contained within the casing 38, and the leads 62 (64) of the conducting tracks pass through the casing 38 for external electrical connection. Such button control device also possesses the fine features as those shown in FIG. 3.

Figure 9:
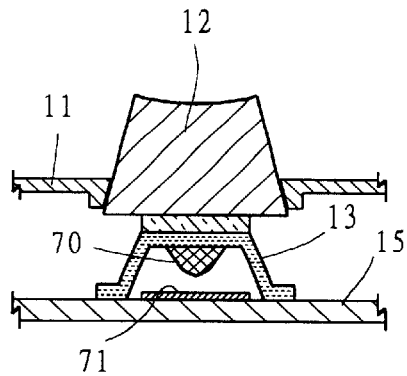
FIG. 9. The fifth instance of embodiment of the present invention in combination with the game control console: (A) structural view before the button is pressed; (B) illustration of the smaller the contact surface, the greater the electrical current resistance; (C) illustration of the greater the contact surface, the smaller the electrical current resistance.
Figure 9:
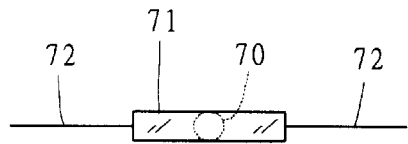
Figure 9:
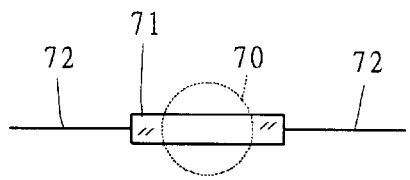

The embodiment shown in FIG. 9 differs from that in FIG. 7 in that the printed circuit board 15 in FIG. 9 has carbon ink 71 (with lead 72), and the conducting jell relative thereto is cone conducting jell (or circular cone conducting jell). When button 12 is pressed downward, the cone conducting jell 70 will have varying contact area with carbon ink as determined by the magnitude of the depressing force; the varying contact area will vary the magnitude of electrical current resistance of carbon ink and thus vary the analog signal output, i.e., the smaller contact area, the greater resistance (see FIG. 9(B)); and the greater contact area, the smaller resistance (see FIG. 9(C)).

Figure 10:
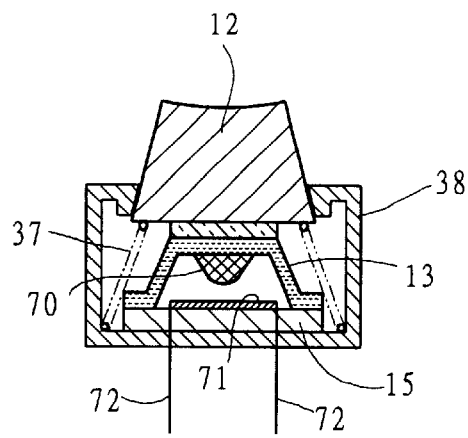
FIG. 10. The fourth instance of embodiment of an unitary body button control based on the structure shown in FIG. 4.

In FIG. 10 is shown a unitary body button control based on the structure shown in FIG. 9. The button 12, rubber member 13, cone conducting jell 70, spring 37, printed circuit board with carbon ink 15 are all contained within the casing 38. The lead 72 of carbon ink 71 (or the printed circuit board 15) passes through the casing for external electrical connection. This button control device possesses the same fine features as the button control depicted in FIG. 3.

Figure 11:
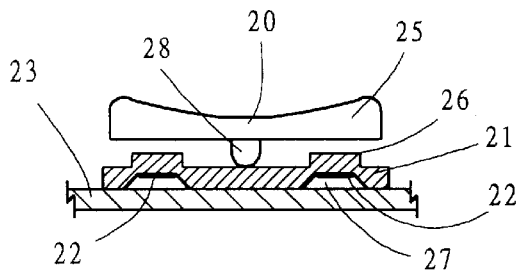
FIG. 11. An instance of embodiment of the cross button of the present invention: (A) When the cross button is not pressed; (B) When the button shown in 11(A) is lightly pressed; (C) the planar view of the schematic of the circuit board for use with the cross button; (D) illustration of the smaller contact area between the conducting jell and the resistor strip resulting from light depression of the button shown in 11(B); (E) illustration of increasing contact area between the conducting jell and the resistor strip resulting from increasing depression of the button shown in 11(B); (F) illustration of the maximum contact area between the conducting jell and the resistor strip resulting from maximum depression of the button shown in 11(B).
Figure 11:
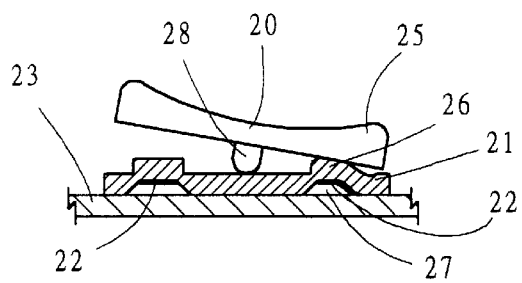
Figure 11:
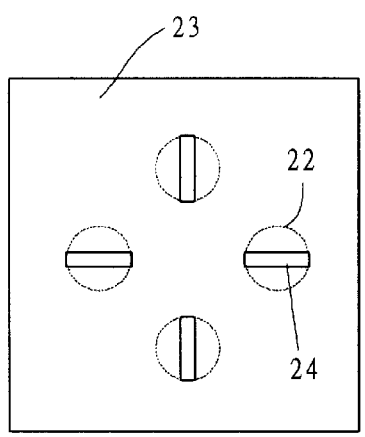
Figure 11:
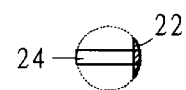
Figure 11:
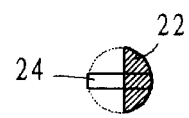
Figure 11:
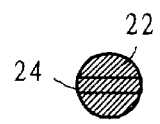

In FIG. 11, underneath the cross button 20 with pivot 28 is a rubber member 21 which is fix positioned on the printed circuit board 23. The rubber member 21 carries protruded portions 26 corresponding to each key 25 of the cross button 20 (4 keys in total). Said protract portions 26 are formed from the internal depressed portions 27. Conducting jell 22 is set on the inner side of the protract portion 26, where each conducting jell 22 is facing relative to the resistor strip 24 on the printed circuit board 23 (see FIG. 11(A) and FIG. 11(C)). In FIG. 11(A), when the cross button 20 is not pressed down, the rubber member 21 is not deformed by key 25, so that none of the conducting jell 22 is in contact with its corresponding resistor 24 (see FIG. 11(C)), in which case the resistance value of the resistor 24 is at maximum. When any one key 25 of the cross button 20 is pressed down with light pressure (see FIG. 11(B)), the cross button 20 pivots around the pivot 28 to a inclined position; the protruded portion 26 of the rubber member 21 will also be driven to a inclined position, in which case the conducting jell 22 at its inner side is also inclined and contacts with the corresponding resistor 24 as shown in FIG. 11(D). Light pressure will result only small contact area between the conducting jell 22 and the resistor strip 24, and slightly reduces the original maximum resistance value. Increasing downward pressure on said key 25 will enlarge the contact area between the conducting jell 22 and the resistor strip 24 and decrease the resistance value of the resistor strip 24 (see FIG. 11(E)). The resistance value of the resistor strip 24 will be at minimum when the conducting jell 22 and the resistor strip 24 are in completely contact (see FIG. 11(F)). Thus in the instance of embodiment, variation in the incline angle of the cross button 20 will vary the size of the contact area between the conducting jell 22 and the resistor strip 24 and thereby causes variation in the magnitude of the output signals. This instance of embodiment, however, is not limited to the cross button, a double-head seesaw type of button can also suffice, for instance.

Figure 12:
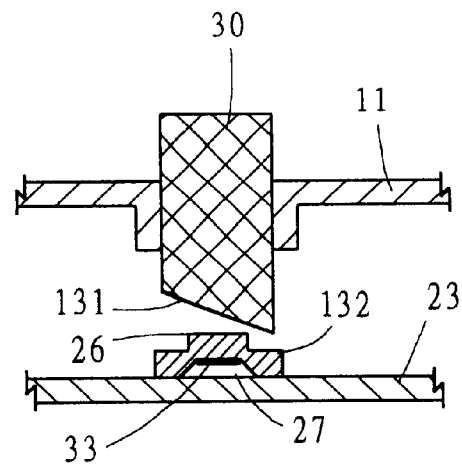
FIG. 12. The first instance of embodiment of the improved-from-ordinary-button of the present invention.

In FIG. 12, a sloped surface 131 is form at the bottom of the button 30 (a general button). The rubber member 132, protruded portions 26, conducting jell 133, depressed portions 27 and the printed circuit board 23 with resistor strips (not shown in the figure) corresponding to the conducting jell 133 are in the equivalent structural relationships as the embodiment shown in FIG. 11. When the button 30 is gradually pressed down, the sloped surface 131 gradually deforms the rubber member 132, thereby increases the size of contact area between the conducting jell 133 and the resistor strip, so as to cause variation in the resistance value of the resistor strip.

Figure 13:
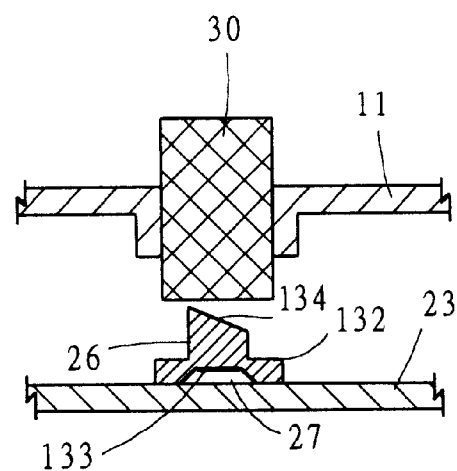
FIG. 13. Another instance of embodiment of the improved-from-ordinary-button of the present invention.

In FIG. 13, in contrast to FIG. 12, the sloped surface 134 is effected on the protruded portion 26, and the same functions as illustrated in FIG. 12 can again be achieved.

Figure 14:
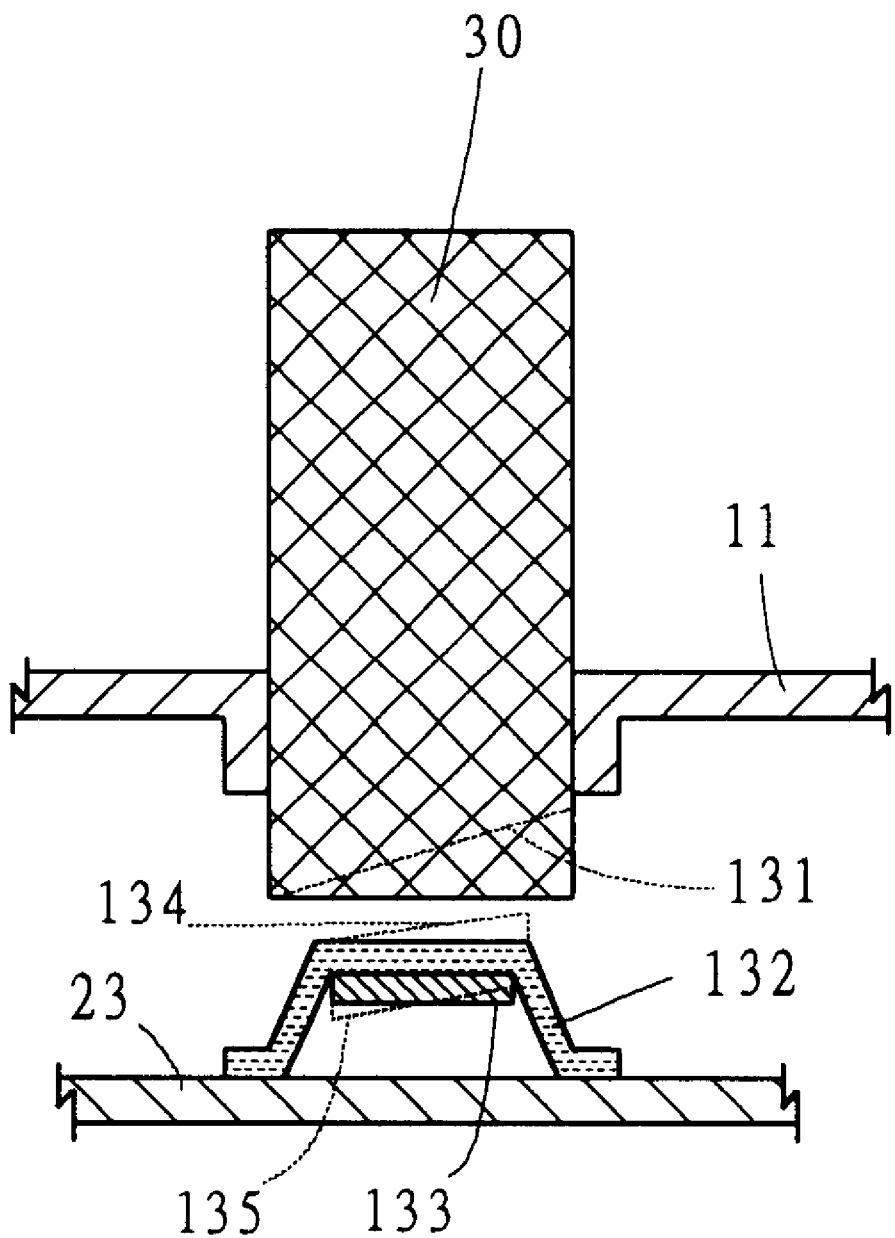
FIG. 14. Another instance of embodiment of a versatile button based on the structure of the ordinary button shown in FIG. 1.

In FIG. 14, the same principle illustrated in FIG. 12 and FIG. 13 is followed; in addition to the sloped surface 131 forming on the bottom of the button 30, or the sloped surface 134 forming on the top of the rubber member 132, a sloped surface 135 can also form on the bottom of the conducting jell 133, which can also achieve the function of varying the resistance value of the resistor strip shown in FIGS. 12 & 13.

Figure 15:
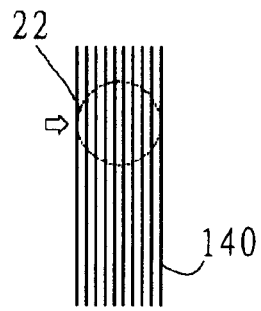
FIG. 15. Another instance of embodiment of installing conducting tracks on the circuit board, wherein: (A) illustration of the button in unpressed state, conducting jell not yet in contact with the conducting tracks; (B) upon a light press of the button shown in 15(A), the conducting jell begins to contact with the conducting tracks; (C) further press of the button shown in 15(A) resulting in increased contact between the conducting jell and the conducting tracks; (D) upon a complete press of the button shown in 15(A), conducting jell and the conducting tracks are in maximum contact.
Figure 15:
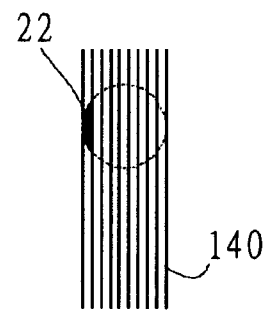
Figure 15:
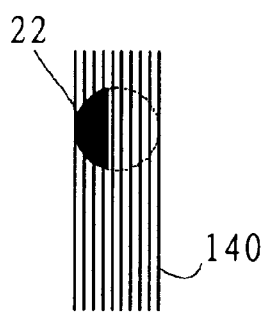
Figure 15:
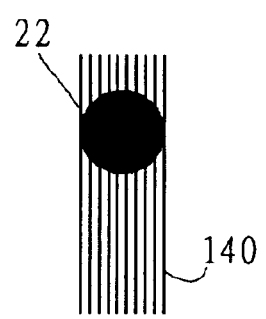

FIG. 15 shows one instance of embodiment in which the resistor strip 24 on the printed circuit board is substituted by conducting tracks 140. In FIG. 15, facing relative to the conducting jell 22 (133) on the printed circuit board is a plurality of conducting tracks 140. Increasing pressure on button 20 or 30 will cause the conducting jell 22 to contact increasing number of conducting tracks from one side of the conducting tracks 140 to the other side, so that the variation in the number of conducting tracks 140 in contact with the conducting jell 22 can vary the signal output.

Figure 16:
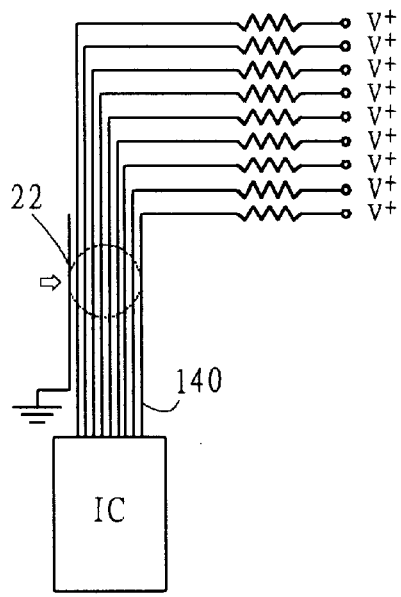
FIG. 16. Showing embodiment of the conducting tracks shown in FIG. 15 in connection with a circuit. Wherein: (A) first instance of embodiment; (B) second instance of embodiment.
Figure 16:
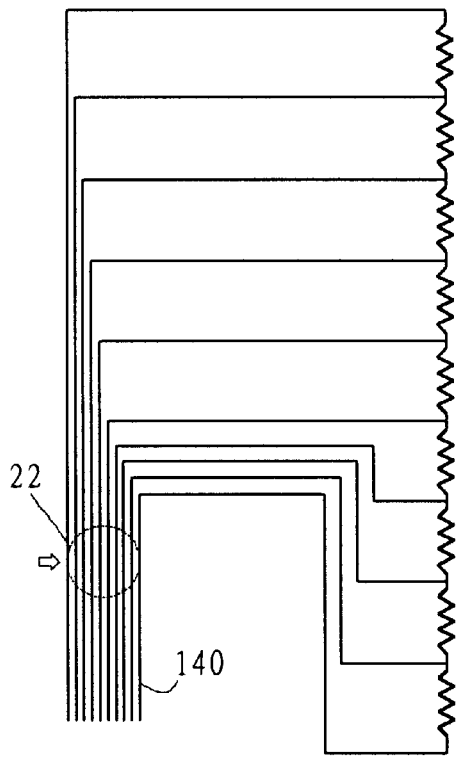

FIG. 16 shows an instance of connection of the conducting tracks shown in FIG. 15 with circuits. In the first instance of embodiment shown in FIG. 16(A), IC is used to read directly the number of conducting tracks 140 in connection with the conducting jell 22. In the second instance of embodiment shown in FIG. 16(B), resistor device is set between the tracks in the conducting tracks 140 so that the variation in the number of conducting tracks 140 in contact with the conducting jell can result in variation in the resistance value to result in varying signal output.

Figure 17:
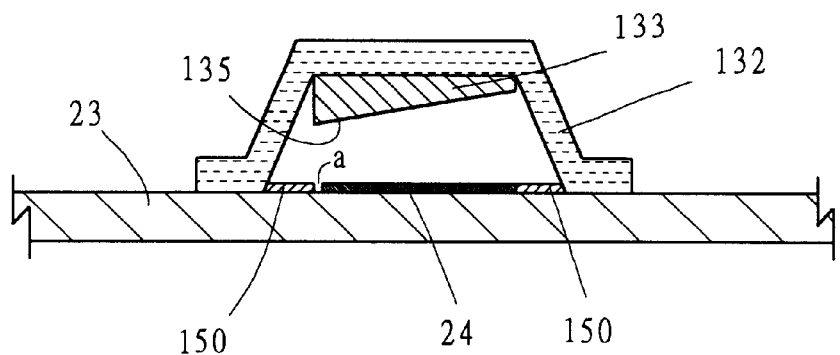
FIG. 17. Showing another embodiment of the conducting jell in contact with the resistor strip, wherein: (A) first instance of embodiment; (B) second instance of embodiment.
Figure 17:
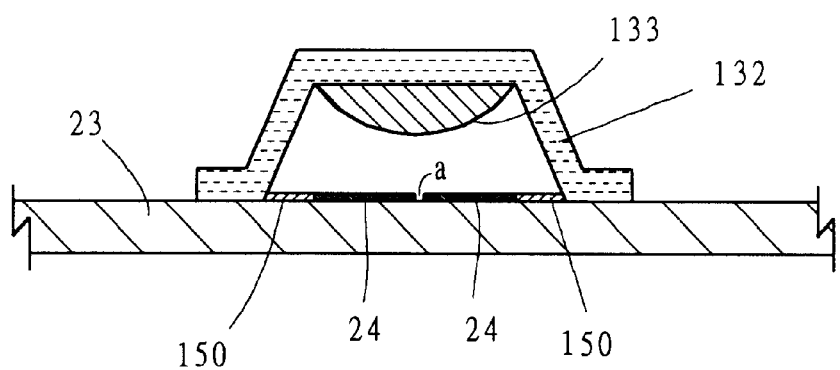

FIG. 17 follows the illustration shown in FIG. 14 and the same elements are labeled the same numbers as in FIG. 14.

In FIG. 17(A), resistor strip 24 is still used which corresponds to the conducting jell 133 having sloped surface 135. The two ends of the resistor strip 24 are connected to tin piece 150; however, one of the two ends is cut open in disconnection, and the cut open partition "a" faces relative to the edge of the sloped surface 135. In this structure of conducting jell 133 with sloped surface 135 and the cut open resistor strip 24, when the conducting jell 133 is pressed down, the resistor 24, because it is cut open, will not conduct current until the instant the conducting jell 133 is in contact, at which point, the resistance value across the tin piece 150 suddenly decreases from infinite resistance to the maximum resistance of the resistance value of the resistor strip 24. When the conducting jell 133 is almost completely in contact with the resistor strip 24, the resistance value across the tin piece 150 decreases to the minute resistance value of the conducting jell 133. Therefore, the drastic reduction of the resistance value from infinite to maximum of the present invention improves over Patent 89204639 in which the small initial change in resistance value when the conducting jell presses on the resistor strip so that reading is made difficult.

In the instance of embodiment shown in FIG. 17(B), the conducting jell 133 has the shape of semi-circle, ellipse or cone, with a warped surface. The resistor strip 24, whose two ends are in connection with the tin piece 150 is cut open, disconnected in its center, where the cut open partition "a" faces relative to the lowest point of the conducting jell 133. This contact structure of conducting jell 133 with warped surface at bottom and the cut open resistor strip 24 aims at achieving the same object as shown in FIG. 17(A).

EFFECTIVENESS OF THE INVENTION

This present invention relates to a button control for use in game controllers. When the button is pressed down, the angle and magnitude of the force of each depression will determine the amount of contact between the conducting jell and the resistor strip or the conducting tracks located on the printed circuit board and thereby determine the magnitude of the output signals so as to gain greater game control. Further, when said resistor strip is made a cut-open, discontinuous structure, then when the conducting jell begins to press on the resistor strip, the resistance changes from infinite resistance to maximum resistance to facilitate reading of button control status. Further, this button control can be made as a unitary component, and can thus facilitate assembly and add to flexibility in appearance and structure designs and lower production cost.

What is claimed is:

1. A button control for use in game control consoles, comprising a button, a rubber member located underneath the button and installed on the printed circuit board, and inside said rubber member is conducting jell facing apart from and relative to the resistor strip on the printed circuit board, with the following characteristics: a sloped surface is formed at the bottom of said button or at the top of the rubber member or at the bottom of the conducting jell, and said resistor strip is a cut-open or non-continuous structure so that when the conducting jell is first pressed down and in contact with the resistor strip, the resistance value across the resistor strip decreases from infinite value to a maximum value for easy reading of the button status, and the gradual depression of said button downward can result in variation of the amount of contact between the conducting jell and the resistor strip on the printed circuit board and thereby vary the magnitude of the output signals.

2. A button control for use in game control consoles, comprising a button, a rubber member located underneath the button and installed on the printed circuit board, and inside said rubber member is conducting jell facing apart from and relative to the resistor strip on the printed circuit board, with the following characteristics: the bottom portion of the conducting jell has a warped surface, and said resistor strip is a cut-open structure, by virtue of the warped surface of the conducting jell, such that when the conducting jell is first pressed down and in contact with the resistor strip, the resistance value across the resistor strip decreases from infinite value to a maximum value for easy reading of the button status, and the gradual depression of said button downward can result in variation of the amount of contact between the conducting jell and the resistor strip on the printed circuit board and thereby vary the magnitude of the output signals.

* * * * *